Figure 8:
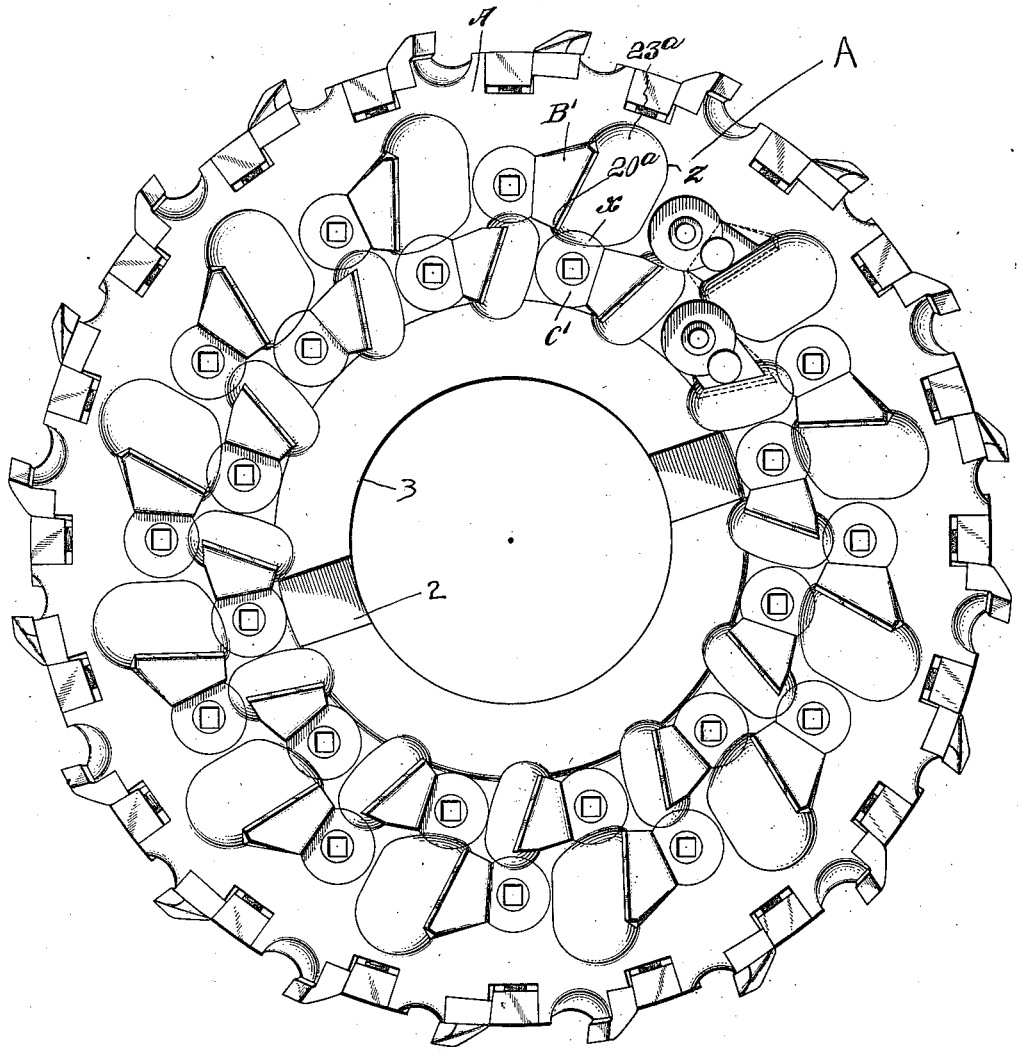

Nov. 6, 1923.  
G. W. CONKLIN  
1,472,960  
DISK CUTTER HAVING STAGGERED SERIES OF SIDE TEETH  
Filed Oct. 28, 1922     3 Sheets-Sheet 1
Fig. 1.
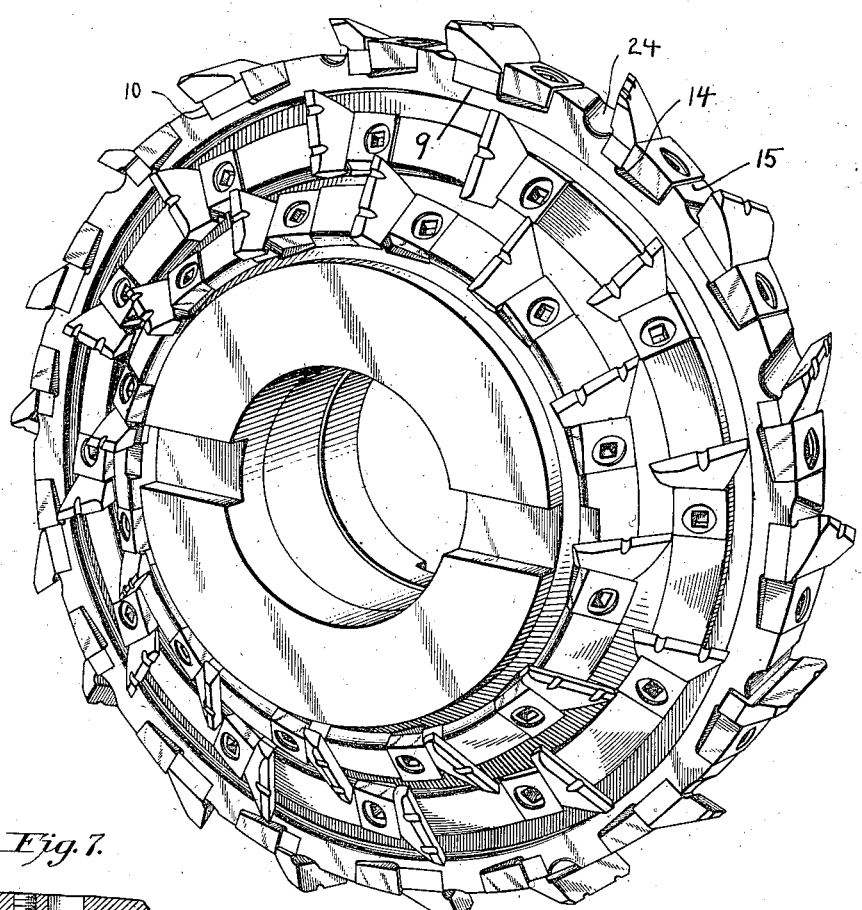
Fig. 7.
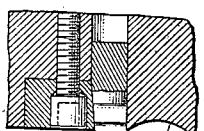
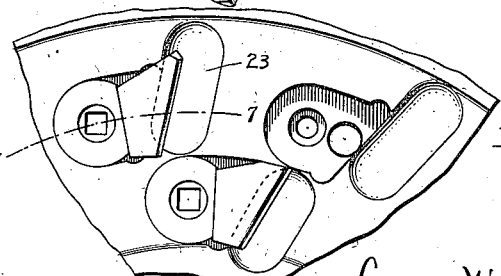
Fig. 6.
Witness  
L. E. Fischer.
Inventor  
George W. Conklin  
By Attorney  
Albert F. Nathan Nov. 6, 1923.                                               1,472,960
                    G. W. CONKLIN
        DISK CUTTER HAVING STAGGERED SERIES OF SIDE TEETH
                  Filed Oct. 28, 1922            3 Sheets-Sheet 2
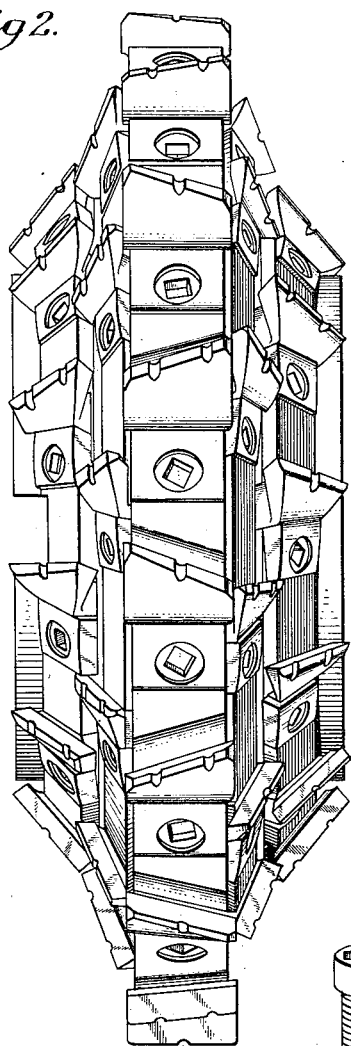
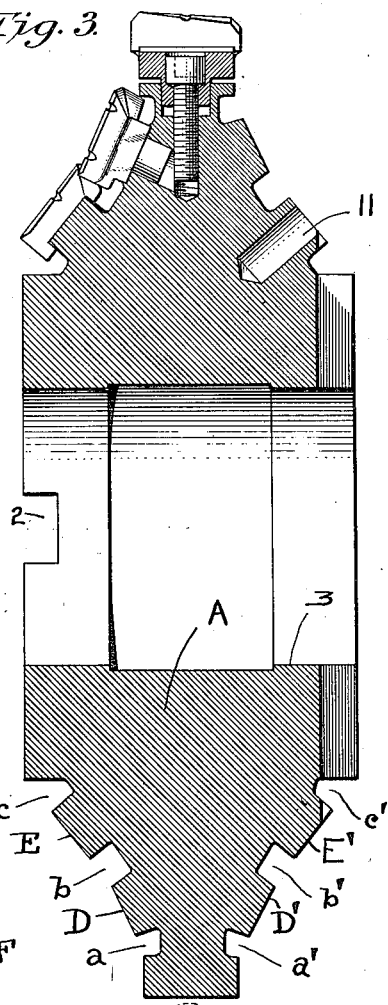
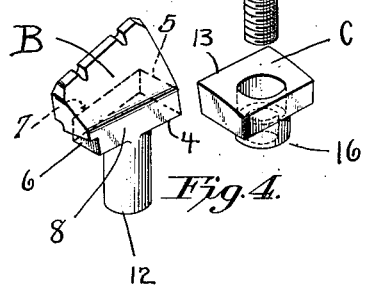
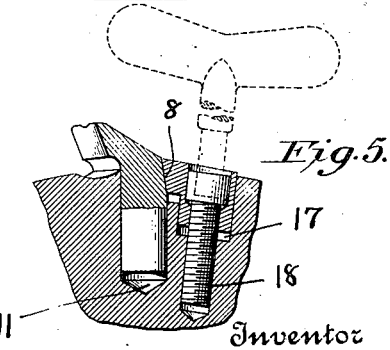
Witness
L. E. Fischer
Inventor
George W. Conklin
By  Attorney
Albert F. Nathan Nov. 6, 1923.　　　　　　　　　　　　　　1,472,960
G. W. CONKLIN
DISK CUTTER HAVING STAGGERED SERIES OF SIDE TEETH
Filed Oct. 28, 1922　　　　3 Sheets-Sheet 3

Patented Nov. 6, 1923.

1,472,960

UNITED STATES PATENT OFFICE.

GEORGE W. CONKLIN, OF SHELTON, CONNECTICUT, ASSIGNOR TO THE O. K. TOOL COMPANY, OF SHELTON, CONNECTICUT, A CORPORATION OF CONNECTICUT.

DISK CUTTER HAVING STAGGERED SERIES OF SIDE TEETH.

Application filed October 28, 1922. Serial No. 597,636.

*To all whom it may concern:*

Be it known that I, GEORGE W. CONKLIN, a citizen of the United States, and residing at Shelton, in the county of Fairfield and State of Connecticut, have invented a new and Improved Disk Cutter Having Staggered Series of Side Teeth, of which the following specification is a full disclosure.

This invention deals with rotatable cutters for metal and it aims to increase the efficiency and metal-cutting capacity of a tool of that nature, whereby the cost and time of machining metal blanks of various forms, and especially gear-blanks, will be materially lowered.

An ordinary milling-cutter is integrally shaped out of the single blank and, consequently, its cutting edges are perforce composed of the same material as the body-portion of the cutter. This has certain technical disadvantages and it has been perceived that a better tool would result from the use of one material especially appropriate for the body-portion of the cutter and another material particularly suitable for the cutting edges. Composite tools have, accordingly, been made in which the peripheral teeth of the milling cutter were in the nature of individual cutting bits secured, in one way or another, to the periphery of the blank.

The object of this invention is to advance the development of the composite type of metal cutter of the rotary type by employing cutting-bits, not only as heretofore on the periphery of the cutter, but also on its sides; and to arrange and secure these cutting bits in a manner such as will produce a rotary cutting-tool of the inserted-tooth type characterized not only by a higher degree of working efficiency but also by a formation facilitating the restoration of the cutter to its original condition or dimensions whenever any, several or all of the teeth become unduly worn, mutilated or broken.

This invention, in its more intense aspect, seeks to provide a rotary metal-cutting tool so formed and devised as to be preeminently suitable for use in rapidly machining blanks into gears, especially when large.

To those ends, this invention contemplates a rotary metal-cutter having one or more series or rows of inserted cutting-bits arranged, not only on the so-called periphery of the body-portion of the cutter-base, but especially on its side-faces; the teeth being inserted in the sides in such a manner as to provide great strength and solidity and to afford not only a high degree of cutting-capacity but also a pronounced facility for self-clearance; whereby clogging will be so far obviated that the tool may be safely run at the limit of its initial cutting capacity (i. e. beyond the continuous cutting-capacity of heretofore-known cutters) without becoming fouled by chips to the extent of being wedged in the work against continued action.

Other objects and advantages will be in part indicated in the following description and in part rendered apparent therefrom in connection with the annexed drawings.

To enable others skilled in the art so fully to grasp the underlying features hereof that they may embody the same in the various ways contemplated by this invention, drawings depicting certain typical constructions have been annexed as a part of this disclosure and, in such drawings, like characters of reference denote corresponding parts throughout all the views, of which:

Fig. 1 is a perspective of a disk-cutter for blanking gears and which embodies characteristics of this invention. Fig. 2 is a front elevation of the said gear-cutter. Fig. 3 is a diametral section taken through the axis of a partially finished cutter showing more clearly the formation of the base and the mounting of the cutting-bits thereon. Fig. 4 shows in perspective one of the isolated cutting-bits with its isolated wedge-block and the isolated screw for retaining the wedge-block in place. Fig. 5 is a fragmentary section showing how the cutting-bits are assembled on the periphery of the base. Fig. 6 is a fragmentary elevation showing a modification embodying further improvements whereby the capacity of the cutter for clearing itself of chips is greatly enhanced. Fig. 7 is a fragmentary section taken along the line 7—7 of Fig. 6. Fig. 8 is a side-elevation of a finished cutter conforming to this modification and representing the preferred form of this invention and the manner best known at this time for embodying it.

The body-portion or base A, in the illustrated embodiments of the invention, assumes a disk-like form and is composed of tough steel shaped to provide a hub-portion which may have the usual key-ways 2 radiating from its center-bore 3 to enable it to be firmly secured to the spindle or arbor of the machine-tool utilized to actuate the cutter. As shown by Fig. 3, the annular blank constituting the base A has in cross-section the shape of a truncated equilateral triangle. This base or body-portion A is shown with a peripheral series of cutting-bits as will be explained hereinafter. The body-portion A is likewise provided above the hub with sides configurated to seat one or more series of side-face cutting-bits; the series on each side being concentric and having the cutting-bits arranged in the peculiar manner shown on the drawings and set forth in detail hereinafter.

In the first form (shown by Figs. 1 to 3, inclusive) the respective side-faces are conical in shape and are provided with a series of annular channels, $a$, $b$, $c$ and $a'$, $b'$, $c'$ designed to receive, and duly discharge, a portion of the chips cut from the metal by the cutting-edges. The side-faces of the base A are thus shaped to provide annular ridges D and D'; and one or more additional ridges (such as that indicated by E and E') may be provided when it is desirable to employ a plurality of said cutting-series of bits B. It will be noted that the faces of the ridges are, in this instance, inclined at different angles to the central plane of the cutter, and thereby the outline of a gear to be cut may to any desirable extent be approximated for generally locating the cutting-bits B inserted in said inclined faces.

Each of the peripheral cutting bits B is of the peculiar form shown by the several drawings but more distinctly by Figs 4 and 5 thereof. These cutting bits have a base or seating portion 4 elongated somewhat in the shape of a truncated right-angled triangle providing a wide end 5 constituting the one side face of the base of the cutting-bit, and have a truncated apex 6 constituting the other side face of the base of the cutting bit. The inclined leg 7 of the truncated triangle constitutes the forward gripping face of the base of the cutting bit and the upright leg 8 of the triangle constitutes the rearward clamping face of the base of the cutting bit. This latter face is also slightly beveled (as shown best by Fig. 5) to adapt it for cooperation with a wedge-block C utilized for locking the cutting-bit positively in place. The portion of the blank A that receives the cutting-bit is recessed (as indicated by 9 in Fig. 1) to provide an appropriate seat for the part just described and especially to provide a forward substantial shoulder indicated by 10 against which the forward edge 7 of the base of the cutting bit is forcibly maintained. The recess 9 in the body portion which receives the base 4 of the cutting bit B is also provided with an aperture 11 extending radially (as shown best by Fig. 5) and the base portion 4 of each cutting-bit is likewise provided with an integrally projecting pin 12 which is adapted to snugly (and in fact tightly) seat within the recess aforesaid. Each cutting-bit is forced down until the under side of its base 4 rests firmly on the floor of the recess and its forward edge 7 presses firmly against the shoulder 10 of the said recess.

This relation is ensured and maintained by the wedge-block C which may be either substantially square in contour, as shown by Fig. 4, or may preferably be the contour shown in the preferred form of the invention depicted by Figs. 6, 8 and 9. The wedge-block provides a flat side 13 which is bevelled conversely to the rear edge 8 of the base of the cutting-bit; this formation serving the three-fold purpose of holding the cutting-bit firmly (1st) against retreat under the cutting pressures, (2nd) against turning or twisting in its mounting and (3rd) against rising out of its socket under the pull of the cutting forces.

The wedge-block C has a backing against a straight or circular shoulder 15 (as the case may be) provided by an auxiliary socket 14 recessed into the main body A of the cutter. This wedge-block C is likewise centralized by a tubular extension 16 which enters a corresponding hole 17 in the main-body A.

To assist in forcing the wedge-block C into its socket and to hold it there, a screw F is threaded into a hole 18 in the main-body and has a head which is countersunk into the exposed face of the wedge-block, as shown; this screw preferably having a square recess in its head to be engaged by a wrench.

The advantage of the modified form shown by Fig. 6 is that the recess for the wedge-block may be formed by a drilling operation and therefore the part may be seated in any surface whatsoever without the necessity of providing channels such as $a$, $b$, $c$ or narrow ridges such as D, E, or the peripheral ridge. This will become apparent by referring to the structural arrangement and formation of the preferred embodiment; from which it will be seen that, by resorting to the segmental wedge-blocks, the annular channels are dispensed with and the body-portion of the cutter is thereby very materially strengthened and the clearance of the chips is accomplished, in a more facile and thorough manner, by shallow individual gouges arranged in offset relation to the side cutting-edges. This construction represents an important characteristic of the invention and, as to certain details, may be best understood by reference to Figs. 6 and 7.

The cutting-edges 20 of the inserted teeth are located at the extreme edges of tapered extensions 21 which are integral with the base-portions of the cutting-bits. These extensions are formed to flare or diverge so as to provide relatively long cutting-edges and said extensions are also formed to overhang (as shown best by Fig. 7) and thereby provide an under-side 22 which receives and directs the chips away from the blank being tooled.

The cutting-bits located on the sides of the device have their edges arranged at an angle to a radius line so that each cutting edge will take a shearing cut and tend, thereby, to direct the chips towards the axis of the cutter and thus function to carry said chips away from the region which is being machined in the blank or so-called "work". This will be understood by referring to each of the figures of the drawings and it will, likewise, be seen that the cutting edges on the actual periphery of the cutter are arranged to slope in alternate directions so as, not only to give a true shearing cut, but also to distribute the chips equally towards each side of the cutter. The side cutting-bits are spaced, likewise, at intervals and the cutting-bits of each circular series are offset with relation to each other so as to provide radial passage ways, so to speak, for better accommodating the flow of the chips towards the point of ultimate discharge which is in the vicinity of the hub of the cutter. It is not necessary to employ as many cutting-bits in each of the circular side-series as in the peripheral-series, and hence by using fewer the said radial passage-ways may have ample areas.

Reverting now to Fig. 7, it will be seen that the gouge 23 forms a curved surface leading away from the base of the tooth so that such chips, as are directed along the under-surface 22 of the tooth-shank 21, will be received (and deflected away) by the scoop-like bottom of the gouge 23. This gouge is relatively shallow but is made ample in width and length so as to provide the easiest way possible a slide-way for permitting the escape of the chips. By referring to Figs. 6 and 7, it will be noted that each of these gouges is elongated in the direction of its cooperating cutting edge. That is to say, like the cutting-edges, they are sloped at an angle to the radius of the cutter and they are fully co-extensive with the cutting edges and their innermost extremities are preferably located somewhat nearer the axis of the cutter than the innermost ends of the corresponding cutting edges. They are thus longer than the cutting-edges with the result that all chips produced by and leaving the innermost tip of each cutting-edge will be received by the inner extension of the adjacent gouge and directed away. Preferably, these gouges are located entirely in the metal of the main body of the cutter, as shown by Fig. 6, but, in certain cases, this may be impracticable inasmuch as (where the teeth are arranged in concentric series) the wedge-blocks C' of the inner series may be located very close to the inner tips 20$^a$ of certain teeth B' of the outer series. In that case the gouges may be lengthened somewhat into the adjacent wedge-blocks C' and have their inner ends formed by grooving the wedge-blocks as indicated by $x$ and may be widened as indicated by $z$, so as to provide every facility for the removal of the chips without any interference from the inner wedge-blocks.

The peripheral teeth are also combined with gouges indicated by 24; these gouges sloping in the same direction as the cutting edge of its peripheral tooth and said peripheral gouges being adapted to receive the chips and direct them towards the side of the cutter, as will be understood. The proportions and formations of the peripheral gouges are shown clearly by the drawings.

It will thus be seen that this invention provides a composite cutter characterized by great strength and providing a large number of cutting-edges arranged in a peripheral series combined with concentric side-series to ensure progressive cutting action; the cutters of each series being adapted to cooperate with those of the next-adjacent series and to assist in clearing away the chips delivered by the preceding cutters.

Without further analysis, the foregoing will so fully reveal the gist of this invention that others can, by applying current knowledge, readily adapt it for various utilizations by retaining one or more of the essential characteristics of either the generic or specific aspects of this invention, and, therefore, such adaptations should be, and are intended to be, comprehended within the meaning and range of equivalency of the following claims:

Having thus revealed this invention, I claim as new and desire to secure the following combinations and elements, or equivalents thereof, by Letters Patent of the United States:

1. A rotary metal-cutter of the inserted-tooth type comprising a base in the nature of an annulus; and a plurality of series of spaced cutting-bits, one of said series being arranged on the periphery of said base and the remaining series being arranged on the side-faces of said base.

2. A rotary metal-cutter of the inserted-tooth type comprising a ring-like base and a multiplicity of metal-cutting bits detachably affixed in circumferential series to each side-face as well as to the periphery of said base, the cutting-bits in each side-series being fewer in number than the cutting-bits constituting the peripheral series.

3. A rotary metal-cutter of the inserted-tooth type comprising an annular blank having in cross-section the shape of a truncated equi-lateral triangle; a first series of spaced cutting-bits arranged on the periphery of said blank; and a second and third series of cutting-bits arranged in concentric relation on a conical side-face of said blank, the cutting-bits of said second side-series being radially adjacent the spaces between the cutting-bits of said third side-series.

4. A rotary metal-cutter of the inserted-tooth type comprising a ring-like base having a conical side-face; and an annular series of cutting-bits arranged on said conical side-face, the cutting edges of said bits being non-convergent to the axis of rotation of said base.

5. A rotary metal-cutter of the inserted-tooth type comprising a ring-like base having a conical side-face; and an annular series of cutting-bits arranged on said conical side-face, the cutting edges of said bits being sloped rearwardly at an obtuse angle to the direction of the cutting action.

6. A rotary metal-cutter of the inserted-tooth type combining an annular base; and a circular series of spaced cutting-bits arranged on a side-face of said base, said side-face providing a corresponding number of gouges arranged to receive and discharge the chips delivered by said cutting-bits.

7. A rotary metal-cutter of the inserted-tooth type comprising a ring-like base; and a multiplicity of metal cutting-bits arranged in concentric circular-series on a side-face of said base, the base being provided with shallow elongated gouges adjacent each cutting-edge to receive the chips therefrom.

8. A rotary metal-cutter of the inserted-tooth type comprising an annular blank; and a plurality of series of spaced cutting-bits, one of said series being arranged on the periphery of said base and the remaining series being arranged on the side-faces of said base, said base being provided with a gouge adjacent each of the cutting-edges adapted to receive the chips therefrom.

9. A rotary metal-cutter of the inserted-tooth type comprising a ring-like base and a multiplicity of metal cutting-bits detachably affixed in circumferential series to each side face as well as to the periphery of said base, the cutting-bits in each side series being fewer in number than the cutting-bits constituting the peripheral series; and said base being provided with gouges immediately adjacent each cutting-edge and extending in the general direction of each cutting-edge.

10. A rotary metal-cutter of the inserted-tooth type comprising an annular blank having in cross-section the shape of a truncated equi-lateral triangle; a first series of spaced cutting-bits arranged on the periphery of said blank; said blank being provided with gouges in the vicinity of each cutting-edge to receive the chips therefrom.

11. A rotary metal-cutter of the inserted-tooth type comprising a ring-like base having a conical side-face; said base being formed to provide shallow gouges adjacent each cutting-edge and elongated in the general direction of each cutting-edge.

12. A rotary metal-cutter of the inserted-tooth type comprising a ring-like base having a conical side-face; said base providing shallow elongated gouges located adjacent each cutting-edge and extending in the direction thereof and terminating closer to the hub of said cutter than said cutting-edges.

In witness whereof, I hereunto subscribe my name, as attested by the two subscribing witnesses.

GEORGE W. CONKLIN.

Witnesses:
FRANK J. NEVINS,
OLE SEVERSON.